(No Model.)

J. H. E. DE CELLES.
EYEGLASSES.

No. 527,268. Patented Oct. 9, 1894.

Witnesses
Chas. F. Schmelz
K. Farrell

Inventor
J. H. E. De Celles,
By Attorney
John C. Dewey.

UNITED STATES PATENT OFFICE.

JOSEPH H. E. DE CELLES, OF SOUTHBRIDGE, MASSACHUSETTS.

EYEGLASSES.

SPECIFICATION forming part of Letters Patent No. 527,268, dated October 9, 1894.

Application filed May 3, 1894. Serial No. 509,908. (No model.)

*To all whom it may concern:*

Be it known that I, JOSEPH H. E. DE CELLES, a citizen of the United States, residing at Southbridge, in the county of Worcester and State of Massachusetts, have invented certain new and useful Improvements in Eyeglasses; and I do hereby declare that the following is a full, clear, and exact description thereof, which, in connection with the drawings making a part of this specification, will enable others skilled in the art to which my invention belongs to make and use the same.

My invention relates to eyeglasses, and to that class of eyeglasses in which the lenses are moved apart in a straight line, and the object of my invention is to improve upon the construction of eyeglasses of the description above referred to, as now ordinarily made, and more particularly to provide an improved bridge or connection between the lenses, which is made strong and durable, so as to hold the lenses in the same vertical plane, and prevent their bending or getting out of shape, relatively to each other.

My invention consists in certain novel features of construction of the bridge or connection between the lenses, as will be hereinafter fully described and the nature thereof indicated by the claims.

Figure 1:
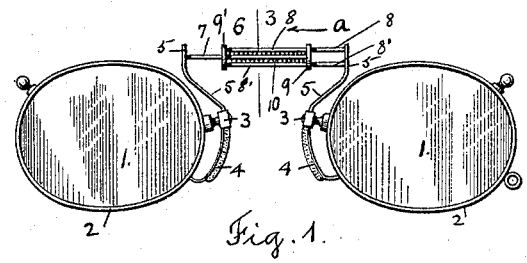
Figure 2:
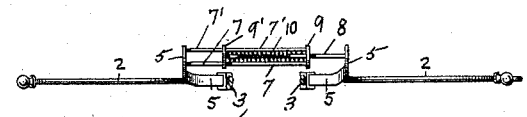
Figure 3:
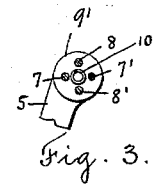
Figure 4:
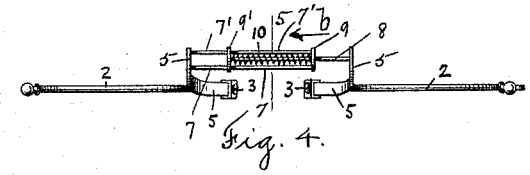
Figure 5:
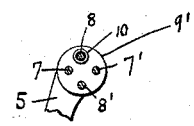

Referring to the drawings:—Figure 1 is a front view of eyeglasses embodying my improvements, with the lenses moved apart. Fig. 2 is a top view of the eyeglasses shown in Fig. 1. Fig. 3 is, on an enlarged scale, a cross section through the bridge or connection, on line 3, 3, Fig. 1, looking in the direction of arrow $a$, same figure. Fig. 4 is a top view of a modified construction of my bridge, showing the spring supported on the top rod. Fig. 5 is, on an enlarged scale, a section through the bridge taken at line 5, 5, Fig. 4, looking in the direction of arrow $b$, same figure.

In the accompanying drawings, the lenses 1, wire rims 2, clamp posts 3, nose guards 4, and bridge side arms 5 are of ordinary and well known construction. Combined with the upper ends of the bridge side arms 5 is the bridge or connection 6, of my improved construction. The bridge or connection 6, which connects the lenses so they may be moved apart in a straight line, consists of two pairs of rods 7, 7', and 8, 8'. One pair of rods, as 7, 7', extend parallel to each other in a horizontal plane, and the other pair of rods, as 8, 8', extend parallel to each other in a vertical plane; and all four rods are parallel to each other. One pair of rods, 7, 7', are attached at their outer ends to the upper end of the bridge side arms 5, and the other pair of rods 8, 8', are attached at their outer ends to the other bridge side arm 5. The inner ends of the pair of rods 7, 7', are attached to a cross head or plate 9, which is supported and moves loosely on the other pair of rods 8, 8', which rods extend loosely through apertures in said cross head or plate 9. The second pair of rods, 8, 8', have their inner ends also attached to a cross head or plate 9', which is also supported and moves loosely on the other pair of rods 7, 7', which rods extend loosely through apertures in said cross head or plate 9'.

Extending between the two cross heads or plates 9, 9', and in this instance inclosed within the two pairs of rods 7, 7' and 8, 8', so as to be held in position, is an expansible spiral spring 10. By placing the spring within the rods, the same is less apt to catch the dust, and is more free to act. The expansion of the spring 10, bearing at each end against the plates 9, 9', acts to move the plates 9, 9' away from each other, and the lenses toward each other, after they have been moved apart as shown in the drawings, to clamp and hold the nose guards on the nose of the wearer.

The spiral spring 10, instead of extending between the two pairs of rods 7, 7', and 8, 8', as shown in Figs. 1, 2, and 3, may encircle any one of the rods; and in Figs. 4 and 5 the spiral spring 10 is shown as encircling the upper rod 8, and confined between the two cross heads or plates 9, 9'.

The advantages of my improved construction of a bridge or connection for eyeglasses, will be readily appreciated by those skilled in the art.

By employing two pairs of rods, arranged as shown in the drawings, and above described, I provide a strong and stiff connection between the lenses, and hold the lenses rigidly in a vertical plane, relatively to each other, and prevent their bending or getting out of shape, which is not the case where three rods are used, and further I make a strong bridge, which will not bend or get out of shape to interfere with the free movement of the lenses toward and away from each other, in a straight line.

I am aware that prior to my invention three rods, forming a bridge or connection between the lenses have been used, and I do not claim such construction.

Having thus described my invention, what I claim as new, and desire to secure by Letters Patent, is—

1. As an improved article of manufacture, eyeglasses adapted to be moved apart in a straight line, and provided with a bridge or connection between the lenses, consisting of two pairs of rods, extending parallel to each other, the outer ends of one pair secured to one bridge side arm, and the outer ends of the other pair secured to the other bridge side arm, and the inner ends of each pair secured to a cross head or plate, mounted and adapted to slide on the other pair of rods, and a spring extending between the plates, substantially as set forth.

2. In eyeglasses, the combination with the bridge side arms, of two pairs of rods arranged parallel to each other, one pair secured to one bridge side arm, and the other pair secured to the other bridge side arm, and the inner ends of each pair secured to a cross head or plate supported and adapted to slide on the other pair of rods, and a spring extending between said plates, for the purpose stated, substantially as set forth.

3. In eyeglasses, the combination with the bridge side arms, of two pairs of rods arranged parallel to each other, one pair secured to one bridge side arm, and the other pair secured to the other bridge side arm, and the inner ends of each pair secured to a cross head or plate supported and adapted to slide on the other pair of rods, and a spring extending between the cross heads or plates, and between the two pairs of rods, for the purpose stated, substantially as set forth.

JOSEPH H. E. DE CELLES.

Witnesses:
ALFRED GALIJEAN,
AMÉDEÉ BONIN.